ABSTRACT OF THE DISCLOSURE

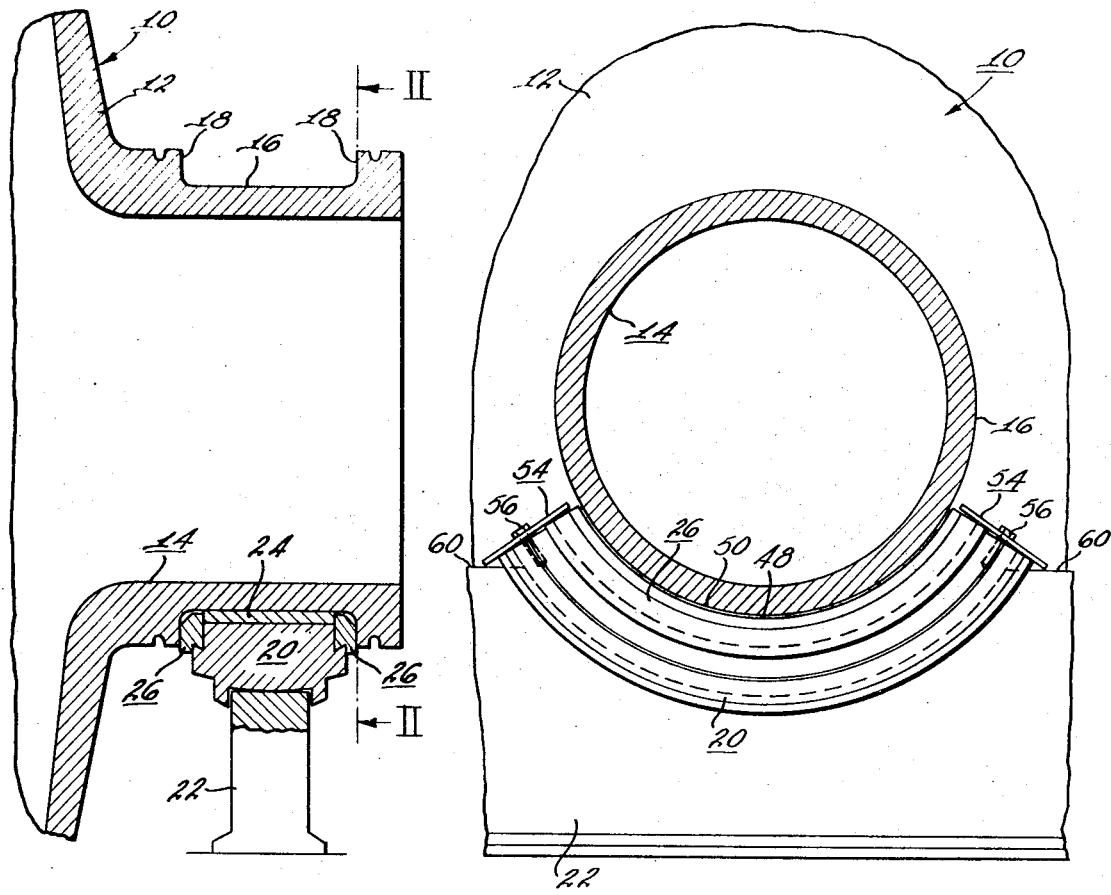
Fig. 1
Fig. 2
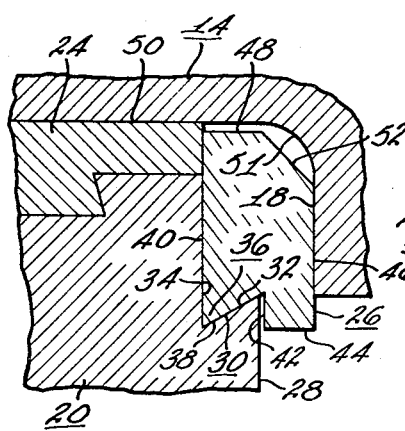
Fig. 3
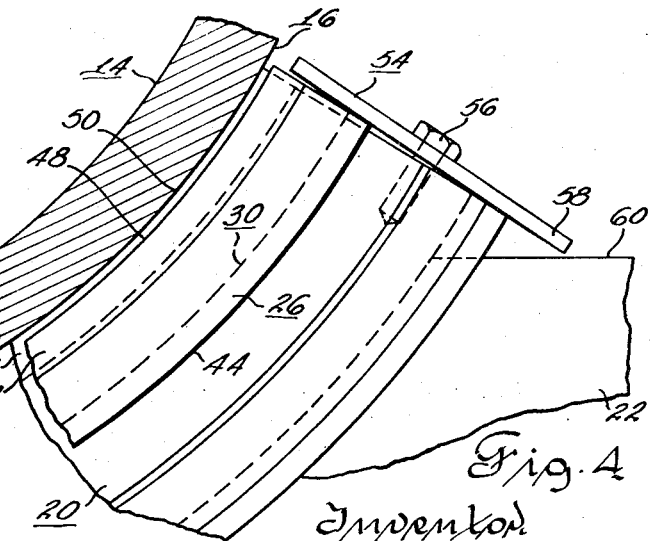
Fig. 4
Inventor
Raymond C. Jenness
by Robert C. Sullivan
Attorney 3,667,819
THRUST BEARING AND MOUNTING
ARRANGEMENT THEREFOR
Raymond C. Jenness, Milwaukee, Wis., assignor to Allis-
Chalmers Manufacturing Company, Milwaukee, Wis.
Filed Aug. 17, 1970, Ser. No. 64,473
Int. Cl. F16c 17/10
U.S. Cl. 308—135                                           11 Claims

A thrust shoe and mounting arrangement therefor particularly suitable for use as the thrust bearing for the trunnion of a rotary grinding mill or the like, in which the thrust shoe is provided with a wedgelike projection which is received in a correspondingly-shaped wedge-shaped recess machined in the end wall of the bearing insert of the upwardly open main bearing for the trunnion. The projection on the thrust shoe and the recess in which it is received typically might extend through a peripheral angle of 120 degrees. A detachable retainer member or clamp overlies the thrust shoe at each of the circumferentially spaced opposite ends thereof, to normally prevent movement of the thrust shoe relative to the bearing insert both in a circumferential as well as axial direction. The end retainer members may be removed to permit the thrust shoe to be slidably moved along the main bearing insert in a circumferential direction until the thrust shoe is free of the bearing insert, thereby permitting removal and replacement of the thrust shoe.

BACKGROUND OF THE INVENTION

Field of the invention

This invention relates to thrust bearings and mounting arrangements therefor, and more particularly to a thrust bearing which is easily installed and easily removed. The thrust bearing of the invention may be used as a thrust bearing for the trunnion of a rotary grinding mill or the like, but it is not restricted to such use.

Description of the prior art

In the prior art relating to thrust bearings or thrust shoes used in connection with the trunnions of grinding mills or the like, it has been common practice to attach the thrust shoe to the side of the main bearing insert by means of flat head cap screws. In such prior art arrangements, if it was desired to remove and replace the thrust shoe, as must be done occasionally, it was necessary to (1) lift the mill to permit removal of the bearing insert; (2) remove the insert; and then (3) remove the thrust shoe from the side of the bearing insert by removing the cap screws which secured the thrust shoe or ring to the bearing insert.

A further disadvantage of the prior art type of thrust shoe mounting arrangement just described is that the use of the cap screws to secure the thrust shoe to the bearing insert subtracted from the available area of the bearing thrust surface. Furthermore, the necessary drilling and tapping operations on the bearing insert to secure the thrust shoe thereto, and the necessary drilling and countersinking of the thrust shoe to receive the cap screws were all operations which added to the expense of mounting the thrust shoe onto the main bearing insert.

SUMMARY OF THE INVENTION

Accordingly, it is an object of the present invention to provide a thrust shoe and mounting arrangement therefor which requires less maintenance time for installation or replacement of the thrust shoe than prior art thrust shoe assemblies.

It is a further object of the invention to provide a thrust bearing construction and mounting arrangement which provides more bearing thrust surface for a given size thrust shoe than constructions of the prior art.

It is a further object of the invention to provide a thrust shoe and mounting arrangement therefor which does not require drilling and tapping operations on the bearing insert which supports the thrust shoe, or drilling and countersinking operations on the thrust shoe.

It is a further object of the invention to provide a thrust shoe and mounting arrangement therefor, which is more economical than thrust bearing constructions and mounting arrangements of the prior art.

It is a further object of the invention to provide an assembly of a thrust shoe and a main bearing, particularly suitable for a grinding mill or the like, which is more economical than prior art constructions and which requires less maintenance time for replacement of the thrust shoe than prior art constructions.

It is a further object of the invention to provide a new and improved combination of a grinding mill or the like and a thrust bearing arrangement therefor.

In achievement of these objectives there is provided in accordance with this invention a thrust shoe and mounting arrangement therefor particularly suitable for use as the thrust bearing for the trunnion of a rotary grinding mill or the like, in which the thrust shoe is provided with a wedgelike projection which is received in a correspondingly-shaped wedge-shaped recess machined in the end wall of the bearing insert of the upwardly open main bearing for the trunnion. The projection on the thrust shoe and the recess in which it is received typically might extend through a peripheral angle of 120 degrees. A detachable retainer member or clamp overlies the thrust shoe at each of the circumferentially spaced opposite ends thereof, to normally prevent circumferential and axial movement of the thrust shoe relative to the bearing insert. The detachable retainer members or clamps also normally prevent excess circumferential movement of the bearing insert relative to the bearing pedestal which supports the bearing insert. The end retainer members may be removed to permit the thrust shoe to be slidably moved along the main bearing insert in a circumferential direction until the thrust shoe is free of the bearing insert, thereby permitting removal and replacement of the thrust shoe.

Further objects and advantages of the invention will become apparent from the following description taken in conjunction with the accompanying drawing in which:

BRIEF DESCRIPTION OF THE DRAWINGS

FIG. 1 is an elevation view in longitudinal section, partially fragmentary, of the end of a rotary grinding mill having a trunnion which is supported by a bearing assembly including the thrust bearing of the invention;

FIG. 2 is a view in vertical section taken along line II—II of FIG. 1;

FIG. 3 is an enlarged fragmetary view, similar to FIG. 1, showing details of the engagement of the thrust shoe with the main bearing insert; and FIG. 4 is an enlarged view similar to FIG. 2 showing details of the engagement of the retainer or clamp member with one end of the thrust bearing.

DESCRIPTION OF THE PREFERRED EMBODIMENT

Referring now to the drawing, there is shown a grinding mill generally indicated at 10 having an end plate or head 12, which is secured to the hollow shell of the grinding mill as is well-known in the art. A hollow trunnion generally indicated at 14, is integral with the end plate 12 of the grinding mill. Trunnion 14 is provided intermediate its length with a countersunk recessed annular surface 16, which is bounded at its opposite ends by annular flange-like surfaces 18. The surface 16 of the trunnion constitutes the journal surface of the trunnion which rotates upon a bearing assembly to be described, and the opposite surfaces 18 constitute thrust shoulders integral with the trunnion which cooperate with the thrust bearing to be described hereinafter.

The trunnion 14 rotates upon a bearing assembly comprising a bearing insert 20 which is supported by a bearing pedestal 22. The radially outer surface of bearing insert 20 which rests on pedestal 22 is of spheroidal shape, and the radially inner surface of pedestal 22 upon which bearing insert 20 rests is of cylindrical contour. The engagement of the spheroidal surface of bearing insert 20 with the cylindrical surface of the support pedestal 22 permits a rocking or rolling action of bearing insert 20 relative to support pedestal 22 which helps the thrust shoes carried by bearing insert 20, as well be explained hereinafter, to properly align themselves relative to the thrust shoulders 18 on the trunnion during operation of the grinding mill. The bearing insert 20 is provided on the radially inner surface thereof with a liner 24 of a suitable bearing material such as Babbitt Metal, for example, which serves as a bearing surface supporting trunnion 14 for rotation. Bearing insert 20 and liner 24 which is secured thereto may extend through a peripheral angle such as 120 degrees circumferentially of trunnion 14, for example, beneath the lower portion of the rotating trunnion. The peripheral angle of 120 degrees through which the bearing insert 20 and liner 24 extend, in the example just given, is not critical and bearing insert 20 and liner 24 may instead extend through an angle of 180 degrees, for example, circumferentially of trunnion 14.

It will be seen from the foregoing that the bearing assembly is upwardly open to permit removal of the grinding mill in an upward direction, if required. Bearing insert 20 and liner 24 constitute what may be referred to as the "main bearing."

In accordance with the invention, a thrust shoe generally indicated at 26 is mounted on each end of bearing insert 20, as will now be described. Thrust shoe 26 is formed of a suitable material such as bronze. Bearing insert 20 is provided on the axial end wall 28 thereof with a peripheral recess generally indicated at 30 which is wedge-shaped in axial cross section as seen in FIGS. 1 and 3. Recess 30 is bounded by the surfaces 32 and 34 and is adapted to receive a mating wedge-shaped projection generally indicated at 36 on thrust shoe 26. Projection 36 includes bounding surfaces 38 and 40 which respectively lie parallel to bounding surfaces 32 and 34 of recess 30 in bearing insert 20.

Thrust shoe 26 includes an outer portion bounded by the surfaces 42, 44 and 46, respectively, in overhanging relation to end wall 28 of bearing insert 20. The surface 42 extends contiguous and parallel to end wall surface 28 of bearing insert 20, but with some clearance such as 1/32 inch between surfaces 28 and 42. Surface 46 of thrust shoe 26 is the thrust surface which engages the facing thrust shoulder surface 18 on rotating trunnion 14. Thus, the thrust action is between shoulder surface 18 on the rotating trunnion, and surface 46 on thrust shoe 26. Thrust shoe 26 may extend through whatever peripheral angle bearing insert 20 extends, and then preferably overlaps each circumferential end of bearing insert 20 by a short distance such as 1/16 inch, for example, this overlap being exaggerated for purposes of clarity in the view of FIG. 4. The angle subtended between the surfaces 34 and 38 of wedge-shaped projection 36 is not critical and may be, for example, in the range 45 degrees–60 degrees. The recess 30 and the mating projection 36 extend for the entire peripheral length of bearing insert 20 and thrust shoe 26 respectively.

The radially inner surface 48 of thrust shoe 26 lies a short distance radially outwardly of the radially inner surface 50 of bearing liner 24. Furthermore, the corner between the surfaces 46 and 48 of thrust shoe 26 is relieved so that there will be no interference between radius 51 on trunnion 14 and relief 52 of thrust ring 26. This relief can be a chamfer at an angle of 45 degrees as indicated at 52, for example.

In order to maintain the thrust shoe 26 in proper position relative to bearing insert 20 and to prevent movement of thrust shoe 26 relative to bearing insert 20, a clamp bar 54 is provided at each of the peripheral ends of the thrust shoe and bearing insert assembly in overlying relation to thrust shoe 26. Clamp bar 54 is held in position by a bolt 56 which extends through clamp bar 54 and into bearing insert 20. The end of clamp bar 54 projects radially beyond the radially outer periphery of bearing insert 20 as indicated at 58 (FIG. 4) to provide a retainer for circumferentially retaining bearing insert 20 with respect to bearing support pedestal 22, and for circumferentially and axially retaining thrust shoe 26 relative to bearing insert 20. The clamp bar 54 provides a force which forces the projection 36 on thrust shoe 26 into the mating recess 30 of bearing insert 20, including an axial force which forces surface 40 on thrust shoe 26 into intimate contact with surface 34 on bearing insert 20. The radially outer end 58 of clamp bar 54 is movable into engagement with surface 60 of support pedestal 22, which serves as a stop member, when a predetermined circumferential movement of bearing insert 20 occurs. A similar clamp bar 54 is provided at each circumferential end of the assembly of thrust shoe 26 and bearing insert 20.

If it is desired to remove thrust shoe 26 for purposes of replacement thereof, clamp bar 54 at each end of the assembly is removed by removing bolt 56, and thrust shoe 26 is then slid along recess 30 of the bearing insert 20 in a circumferential direction until it is free and clear of bearing insert 20.

If upon mill shut down, the journal shoulder 18 applies pressure against the thrust shoe 26 which is to be removed, it may be necessary to float the mill within its main bearings by the application of hydrostatic oil pressure, and then applying axial pressure between the mill and its pier (the foundation for the main bearings) in order to relieve the thrust load to facilitate removal of the thrust shoe 26.

While the thrust shoe 26 at only one end of the bearing insert 20 has been described it will be understood that a similar thrust shoe 26 and mounting arrangement therefor is provided at each end of bearing insert 20. It will also be understood, of course, that a bearing assembly similar to that described hereinbefore is provided at each end of the mill.

From the foregoing detailed description of the present invention, it has been shown how the objects of the invention have been obtained in a preferred manner. However, modifications and equivalents of the disclosed concepts such as readily occur to those skilled in the art are intended to be included within the scope of this invention.

The embodiments of the invention in which an exclusive property or privilege is claimed are defined as follows:

1. A bearing assembly comprising a main bearing having an arcuate extent between the opposite circumferential ends thereof such as to extend only along part of the circumference of the member journalled for rotation therein, a bearing pedestal supporting said main bearing, said main bearing including a wedge-shaped recess extending along the entire peripheral length of an axial end wall thereof, a thrust shoe adapted to receive thrust force exerted by the member journalled in said main bearing, said thrust shoe including a wedge-shaped projection circumferentially slidably received in mating engagement with said recess of said main bearing whereby to secure said thrust shoe to said main bearing, said thrust shoe including a portion thereof overhanging the recessed end wall of said main bearing and adapted to be engaged by a thrust transmitting means on the member journalled for rotation, and clamping means detachably secured to said main bearing and engaging said thrust shoe to prevent circumferential and axial movement of said thrust shoe relative to said main bearing, said clamping means comprising a separate clamp member corresponding to each of the opposite circumferential ends of said main bearing, each respective separate clamp member being detachably secured to its corresponding circumferential end of said main bearing and engaging a corresponding circumferential end of said thrust shoe.

2. A bearing assembly as defined in claim 1 in which said main bearing and said thrust shoe are upwardly open.

3. A bearing assembly as defined in claim 1 in which a thrust shoe is mounted on each of the axially opposite ends of said main bearing.

4. A bearing assembly as defined in claim 1 in which each of said clamping members is positioned to abut against said bearing pedestal upon a predetermined circumferential movement of said main bearing relative to said bearing pedestal, whereby to limit the circumferential movement in either direction of said main bearing relative to said bearing pedestal.

5. A bearing assembly adapted to rotatably support a member journalled for rotation therein, comprising a bearing pedestal, a bearing insert supported by said bearing pedestal, a bearing liner carried by a radially inner surface of said bearing insert, said bearing insert having an arcuate extent between the opposite circumferential ends thereof such as to extend only along part of the circumference of the member journalled for rotation, said bearing insert including a wedge-shaped recess along the entire peripheral length of an axial end wall thereof, a thrust shoe adapted to receive thrust forces exerted by the member journalled for rotation, said thrust shoe including a wedge-shaped projection circumferentially slidably received in mating engagement with said recess of said bearing insert whereby to secure said thrust shoe to said bearing insert, said thrust shoe including a portion thereof overhanging the recessed end wall of said bearing insert and adapted to be engaged by thrust transmitting means on the member journalled for rotation, and clamping means detachably secured to said bearing insert and engaging said thrust shoe to prevent circumferential and axial movement of said thrust shoe relative to said bearing insert, said clamping means comprising a separate clamp member corresponding to each of the opposite circumferential ends of said bearing insert, each respective separate clamp member being detachably secured to its corresponding circumferential end of said bearing insert and engaging a corresponding circumferential end of said thrust shoe.

6. A bearing assembly as defined in claim 5 in which each of said clamping members is positioned to abut against said bearing pedestal upon a predetermined circumferential movement of said bearing insert relative to said bearing pedestal, whereby to limit the circumferential movement in either direction of said bearing insert relative to said bearing pedestal.

7. A bearing assembly as defined in claim 5 in which said main bearing and said thrust shoe are upwardly open.

8. A bearing assembly as defined in claim 5 in which a thrust shoe is mounted on each of the axially opposite ends of said bearing insert.

9. A bearing assembly adapted to rotatably support a member journalled for rotation therein comprising a bearing pedestal, a bearing insert supported by said bearing pedestal, a bearing liner carried by a radially inner surface of said bearing insert, said bearing insert having an arcuate extent between the opposite circumferential ends thereof such as to extend only along part of the circumference of the member journalled for rotation, said bearing insert including a recess along the entire peripheral length of an axial end wall thereof, a thrust shoe adapted to receive thrust forces exerted by the member journalled for rotation, said thrust shoe including a projection circumferentially slidably received in mating engagement with said recess of said bearing insert whereby to secure said thrust shoe to said bearing insert, said thrust shoe including a portion thereof overhanging the recessed end wall of said bearing insert and adapted to be engaged by thrust transmitting means on the rotatably mounted member, and clamping means detachably secured to said bearing insert and engaging said thrust shoe to prevent circumferential and axial movement of said thrust shoe relative to said bearing insert, said clamping means comprising a separate clamp member corresponding to each of the opposite circumferential ends of said bearing insert, each respective separate clamp member being detachably secured to its corresponding circumferential end of said bearing insert and engaging a corresponding circumferential end of said thrust shoe.

10. A bearing assembly as defined in claim 9 in which each of said clamping members is positioned to abut against said bearing pedestal upon a predetermined circumferential movement of said bearing insert relative to said bearing pedestal, whereby to limit the circumferential movement in either direction of said bearing insert relative to said bearing pedestal.

11. A bearing assembly as defined in claim 9 in which said bearing insert and said thrust shoe are upwardly open.

References Cited
UNITED STATES PATENTS

| | | | |
|---|---|---|---|
| 1,358,306 | 11/1920 | Finerty et al. | 308—165 |
| 1,400,267 | 12/1921 | Cox | 308—165 |
| 1,649,258 | 11/1927 | Rummins | 308—165 |

MARTIN P. SCHWADRON, Primary Examiner

F. SUSKO, Assistant Examiner